US006161104A

United States Patent [19]
Stakutis et al.

[11] Patent Number: 6,161,104
[45] Date of Patent: *Dec. 12, 2000

[54] METHODS AND APPARATUS FOR HIGH-SPEED ACCESS TO AND SHARING OF STORAGE DEVICES ON A NETWORKED DIGITAL DATA PROCESSING SYSTEM

[75] Inventors: Christopher J. Stakutis, Concord; Kevin M. Stearns, Maynard, both of Mass.

[73] Assignee: IBM Corporation, Armonk, N.Y.

[*] Notice: This patent is subject to a terminal disclaimer.

[21] Appl. No.: 09/309,453

[22] Filed: May 11, 1999

Related U.S. Application Data

[63] Continuation of application No. 09/002,266, Dec. 31, 1997.

[51] Int. Cl.$^7$ ..................................................... G06F 17/30
[52] U.S. Cl. ................................. 707/10; 707/8; 707/100
[58] Field of Search ........................... 395/200.45, 200.7, 395/200.54, 200.59, 200.33, 200.61, 200.57, 489, 182.04; 707/10, 8, 100; 709/229, 230, 215, 240, 227, 203; 714/6; 711/162, 141

[56] References Cited

U.S. PATENT DOCUMENTS

| | | | |
|---|---|---|---|
| 5,163,156 | 11/1992 | Leung et al. ............................. | 709/215 |
| 5,193,168 | 3/1993 | Corrigan et al. ........................ | 707/100 |
| 5,218,676 | 6/1993 | Ben-Ayed et al. ...................... | 709/240 |
| 5,218,697 | 6/1993 | Chung .................................... | 709/230 |
| 5,367,698 | 11/1994 | Webber et al. .......................... | 709/203 |
| 5,388,243 | 2/1995 | Glider et al. ............................ | 710/38 |
| 5,463,381 | 10/1995 | Ryu et al. ................................ | 707/10 |

(List continued on next page.)

FOREIGN PATENT DOCUMENTS 0 476 962  3/1992  European Pat. Off. .

OTHER PUBLICATIONS

Pulutney, John. "Alternative LANs push multimedia spped limits," MacWeek vol. 9 (Jul. 1995) No. 28, pp. 16, 18.

*Primary Examiner*—Wayne Amsbury
*Assistant Examiner*—Thuy Pardo
*Attorney, Agent, or Firm*—Nutter, McClennen & Fish; David J. Powsner

[57] ABSTRACT

The invention provides a digital data processing system with improved access to information stored on a peripheral device. The system has a plurality of nodes, a peripheral device, a file system and a bypass mechanism. A first node (e.g., a client node) is connected to a second node (e.g., a server node) over a first communications pataway (e.g., a network). The second node is itself connected to a peripheral device (e.g., a disk drive) over a second communications pathway. The first node, too, is connected to the peripheral device over a third communications pathway. The file system, executing on the first and second nodes, is capable of responding to access requests generated by the first node for transferring data between that node and the peripheral device, via the second node and via the first and second communications pathways. The file system also maintains administrative information pertaining to storage on the peripheral device of data designated by such requests. That information includes, for example, physical storage location mappings for files and other data stored on the peripheral device. The bypass mechanism, which executes on at least the first node, intercedes in the response to at least selected input/output, or access, requests generated by that node. The bypass transfers data designated by such requests between the first node and the peripheral device over the third communications pathway, in lieu of transferring that data via the second node and the first and second communications pathways. Such transfers by the bypass, however, are made using the administrative information maintained by the file system relating to storage of such data on the peripheral device.

39 Claims, 4 Drawing Sheets

U.S. PATENT DOCUMENTS

| | | | |
|---|---|---|---|
| 5,463,754 | 10/1995 | Beausoliel et al. | 709/213 |
| 5,530,857 | 6/1996 | Glimza | 707/10 |
| 5,530,905 | 6/1996 | Nichols et al. | 709/227 |
| 5,537,574 | 7/1996 | Elko et al. | 711/141 |
| 5,577,240 | 11/1996 | Demers et al. | 707/18 |
| 5,592,612 | 1/1997 | Birk | 714/6 |
| 5,657,450 | 8/1997 | Rao et al. | 707/10 |
| 5,675,798 | 10/1997 | Chang | 709/224 |
| 5,692,128 | 11/1997 | Bolles et al. | 709/224 |
| 5,734,828 | 3/1998 | Pendse et al. | 709/203 |
| 5,737,536 | 4/1998 | Herrmann et al. | 709/220 |
| 5,740,371 | 4/1998 | Wallis | 709/229 |
| 5,751,997 | 5/1998 | Kullick et al. | 711/162 |
| 5,768,528 | 6/1998 | Stumm | 709/231 |
| 5,774,670 | 6/1998 | Montulli | 709/227 |
| 5,812,754 | 9/1998 | Lui et al. | 714/6 |
| 5,842,211 | 11/1998 | Horadan et al. | 707/10 |
| 5,950,203 | 9/1999 | Stakutis et al. | 707/10 |
| 6,067,545 | 5/2000 | Wolff | 707/10 |
| 6,084,892 | 7/2000 | Benash et al. | 370/701 |
| 6,085,246 | 7/2000 | Brandt et al. | 709/227 |

METHODS AND APPARATUS FOR HIGH-SPEED ACCESS TO AND SHARING OF STORAGE DEVICES ON A NETWORKED DIGITAL DATA PROCESSING SYSTEM

This application is a continuation of U.S. Pat. application Ser. No. 09/002,266 filed on Dec. 31, 1997, the teachings of which are incorporated herein by reference.

BACKGROUND OF THE INVENTION

The invention pertains to digital data processing and, more particularly, to high-speed access to and sharing of disk drives and other storage devices on a networked digital data processing system. The invention has application, for example, in accessing and sharing video, graphics and other large data files on a networked computer system.

In early computer systems, long-term data storage was typically accomplished via dedicated storage devices, such as tape and disk drives, connected to a data central computer. Requests to read and write data generated by applications programs were processed by special-purpose input/output routines resident in the computer operating system. With the advent of "time sharing" and other early multiprocessing techniques, multiple users could simultaneously store and access data—albeit only through the central storage devices.

With the rise of the personal computer (and workstation) in the 1980's, demand by business users led to development of interconnection mechanisms that permitted otherwise independent computers to access on one another's storage devices. Though computer "networks" had been known prior to this, they typically permitted only communications, not storage sharing.

Increases in the power of the personal computer is opening ever more avenues for their use. Video editing applications, for example, have until recently demanded specialized video production systems. Now, however, such applications can be run on high-end personal computers. By coupling these into a network, multiple users can share and edit a single video work.

Alas, network infrastructures have not kept pace with the computers which they connect. Though small data files can be transferred and shared quite effectively over conventional network interconnects, such as ethernet, these do not lend themselves to sharing and transferring large files. Thus, although users are accustomed to seemingly instantaneous file access over a network, it can take over an hour to transfer a 60 sec. video file that is 1.2 GBytes in length.

The prior art has developed interconnects that permit high-speed transfers to storage devices. The so-called fiber channel, for example, affords transfers at rates of up to 100 MBytes/sec—more than two orders of magnitude faster than conventional network interconnects. Although a single storage device may sport multiple fiber channel interfaces, no system has been developed to permit those workstations to share files on that storage device.

In view of the foregoing, an object of the invention is to provide improved digital data processing systems and, particularly, improved methods and apparatus of high-speed access to, and sharing of, disk drives and other storage devices on a networked Computer system.

A related aspect of the invention is to provide such systems as can be implemented with minimum cost and maximum reliability.

Yet another object of the invention is to provide such systems as can be readily adapted to pre-existing data processing systems.

Yet still another object of the invention is to provide such systems as can be readily integrated with conventional operating system software and, particularly, conventional file systems and other input/output subsystems.

SUMMARY OF THE INVENTION

The foregoing objects are among those attained by the invention, which provides novel methods and apparatus for sharing peripheral devices on a networked digital data processing system.

In one aspect, the invention provides a digital data processing system with improved access to information stored on a peripheral device. The system has a plurality of digital data processing nodes and a peripheral device. A first node (e.g., a "client" node) is connected to a second node (e.g., a "server" node) over a first communications pathway (e.g., a network). The second node is itself connected to the peripheral device (e.g., a disk drive) over a second communications pathway. The first node, too, is connected to the peripheral device, over a third communications pathway.

By way of non-limiting example, the first and second nodes cam be a client and server networked to one another by Ethernet or other communications media, e.g., in a wide area network, local area network, the Internet interconnect, or other network arrangement. The server and client can be connected to the peripheral device, e.g., a disk drive, mass storage device or other mapped device, via a SCSI channel or other conventional peripheral device channel. Preferably, however, they are connected to the peripheral device via a fibre channel, "firewire" (i.e., IEEE 1394 bus), serial storage architecture (SSA) bus, high-speed Ethernet bus, high performance parallel interface (HPPI) bus or other high-speed peripheral device bus.

A file system, executing on the first and second nodes, is capable of responding to access requests generated by the first node for transferring data between that node and the peripheral device, via the second node and via the first and second communications pathways. The file system also maintains administrative information pertaining to storage on the peripheral device of data designated by such requests. That information includes, for example, physical storage location mappings (or "file maps") for files and other data stored on the peripheral device. By way of example, the file system can represent the combined functionality of conventional local and network file systems, e.g., on Windows NT or UNIX client and server file systems.

A bypass mechanism, which executes on at least the first node, intercedes in the response to at least selected input/output, or access, requests generated by that node. The bypass transfers data designated by such requests between the first node and the peripheral device over the third communications pathway, in lieu of transferring that data via the second node and the first and second communications pathways. Such transfers by the bypass are made using the administrative information maintained by the file system relating to storage of such data on the peripheral device.

By way of example, the bypass can intercede in response to requests by the applications programs executing on the first node to read or write data on the peripheral device. Rather than permitting the file system to transfer that data via the first and second communications pathways, the bypass transfers it directly over the third communications pathway to the peripheral device. File mappings governing the physical locations at which the data is stored on the peripheral device are obtained from the second node.

Further aspects of the invention provide digital data processing systems as described above in which the bypass obtains such file mappings or other administrative information by applying further access requests to the file system. In one such aspect of the invention, the bypass issues two such requests. A first request causes the information to be retrieved into an actual or virtual ("ghost") file local to the second node. A second request by the first node causes that information to be transferred over the network back to the first node.

In a related aspect of the invention, the bypass issues an access request, e.g., a file write, to a logical unit to which access is controlled by the second node. Data contained in that request identifies the file to which the original access request was directed and for which mappings are required. The logical unit specified in the further request can be, for example, a file on the peripheral device (e.g., other than file to which the original access request was directed) or, preferably, a "ghost" file. A second bypass, executing on the second node and coupled to the file system resident there, intercedes in response to that request by obtaining the file mappings from the second node. This is accomplished, for example, through issuance of a request to the local or network file system resident on the second node. The second bypass stores that information in the logical unit designated by the first request.

In further accord with this aspect of the invention, the first bypass issues a still further access request, e.g., file read, to the same logical unit. The server bypass can intercede in the file system's response to that request, e.g., where the logical unit is a ghost file, by causing the file system to pass back file mappings previously stored to the resident data structures.

In a related aspect of the invention, the client bypasses selectively limits transfers between their respective nodes and the peripheral device and, thereby, prevents the nodes from "hogging" that resource. Limiting can be accomplished, for example, using throttling limit or other numerical value specifying, e.g., a maximum quantity of data transfer by the respective node per unit time.

Still further aspects of the invention provide a scaleable networked digital data processing system comprising first and second nodes configured as described in which the first and second nodes are server nodes, each of which is coupled to one or more client nodes. Related aspects of the invention provide such a scaleable networked system comprising a third server node, itself coupled to one or more client nodes, as well as to the second node over a fourth communications pathway. As with the first node, the third node, too, includes a bypass that responds to requests generated by that node for transferring data designated thereby between the third node and the peripheral device over an additional communications pathway.

Still further aspects of the invention provide methods of operating digital data processing systems paralleling the operations described above.

BRIEF DESCRIPTION OF THE ILLUSTRATED EMBODIMENT

A more complete understanding of the invention may be attained by reference to the drawings, in which FIG. 1 depicts a scaleable networked digital data processing system configured in accord with the invention;

FIG. 2 depicts the software architecture of two nodes sharing a peripheral device in accord with the invention; and FIGS. 3 and 4 show a messaging sequence illustrating a method of operating a digital data processing system in accord with the invention.

DETAILED DESCRIPTION OF THE ILLUSTRATED EMBODIMENT

Figure 1:
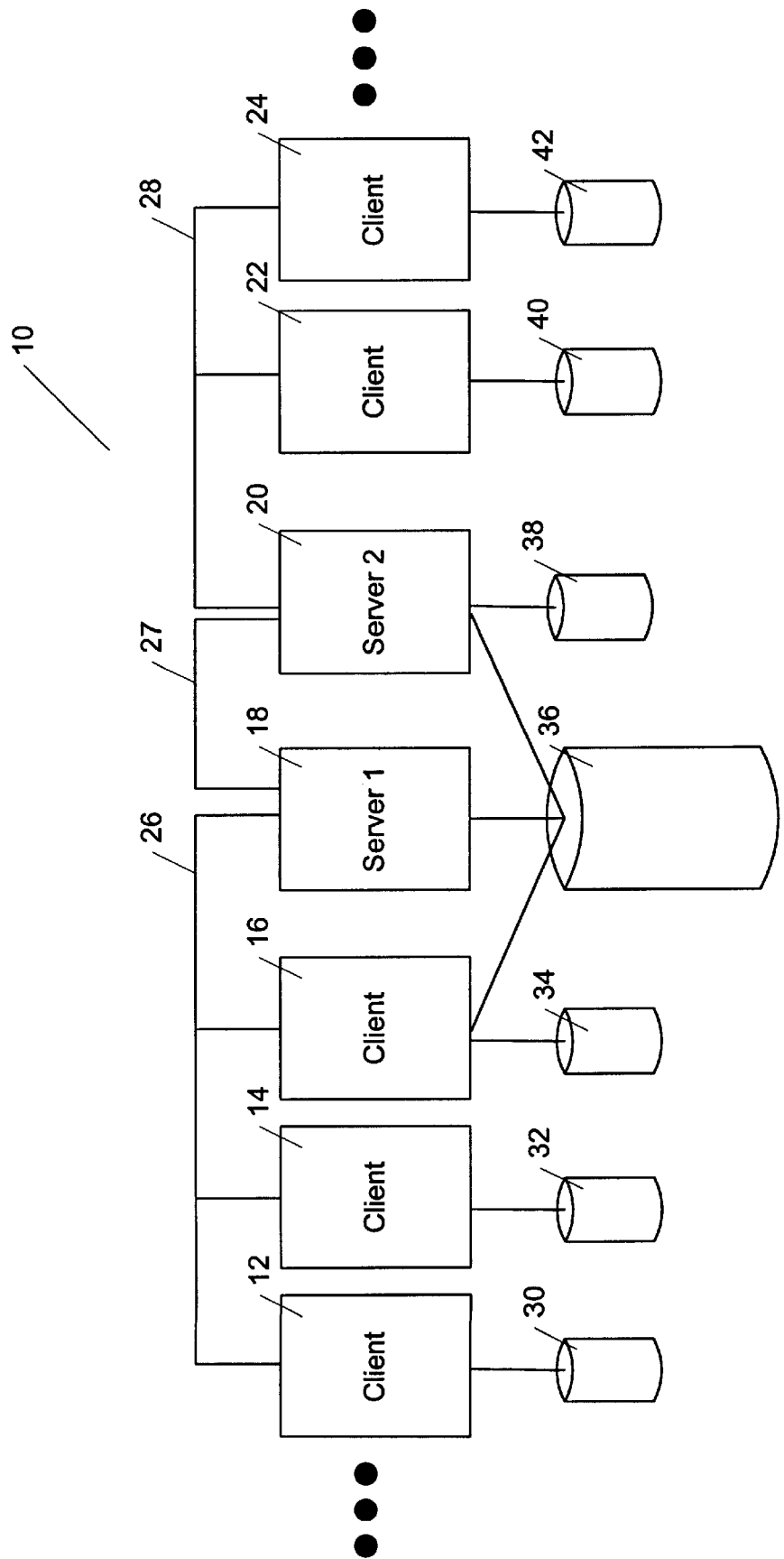

FIG. 1 depicts a scaleable networked digital data processing system configured in accord with the invention. The system 10 includes a plurality of nodes 12–24, including two server nodes 18, 20 coupled via network pathways 26, 28 to client nodes 12–16 and 22–24, as shown. Server nodes 18, 20 are additionally coupled to one another via network pathway 27.

In the illustrated embodiment, nodes 12–24 represent digital data processing apparatus or other devices capable of being coupled to one another in a network and, more particularly, by way of example, in a client-server configuration. Illustrated server nodes 18, 20 represent mainframe computers, workstations, personal computers, or other digital data processing apparatus capable of providing server functions in such networks and, particularly, of controlling access to shared peripheral devices, such as storage device 36. Nodes 12–16 and 22–24 likewise represent workstations, personal computers, dedicated devices, or other digital data processing apparatus that generate requests for access to such shared peripheral devices.

The network pathways 26–28 represent wire cable interconnects, wireless interconnects, point-to-point interconnects, Internet interconnects or other digital communications interconnects of the type known in the art. Those pathways can be configured in any configuration that permits a node 12–16, 20–24 requesting access to a shared peripheral device 36 to communicate that request to a node 18 controlling access thereto. For purposes hereof and unless otherwise evident from context, such a requesting node is referred to as a "client," regardless of its role (i.e., as a client or server) in the conventional network defined by nodes 12–18 and pathway 26, or nodes 20–24 and pathway 28. Thus, for example, node 18 could be a "client" to node 16 for purposes of sharing peripheral device 34, presuming an auxiliary connection (e.g., fibre channel) were provided between node 18 and that peripheral device.

In the illustrated embodiment, nodes 12–24 operate under the Microsoft Windows NT operating system, though those skilled in the art will appreciate that the nodes 12–24 may utilize other client and server operating systems, as well. Moreover, it will be appreciate that nodes need not utilize the same operating systems. Thus, for example, server 18 may operate as a Windows NT-based server, while server 20 operates as a UNIX-based server. The invention is therefore seen to have the advantage of permitting multiple nodes of different pedigrees, or operating system types, to share a common peripheral device.

With further reference to FIG. 1, the nodes 12–24 are coupled to respective dedicated storage devices 30–42, as shown. Such couplings are provided by SCSI channels or other device interconnects suitable for permitting the nodes to transfer information with such devices. In addition to being coupled to their own dedicated storage devices 34, 38, nodes 16, 20 are coupled to the storage device 36 that is controlled by node 18. In the parlance of the invention, nodes 16, 20 are referred to as "clients" and node 18 is referred to as a "server." Coupling between the clients 16, 20 and the shared peripheral device 36 can be provided by any conventional peripheral device interconnect, though, preferably, it is provided by high-speed interconnects such as fibre channel, "firewire" (i.e., IEEE 1394 bus), serial storage architecture (SSA) bus, high-speed Ethernet bus, high performance parallel interface (HPPI) bus or other high-speed peripheral device bus.

Figure 2:
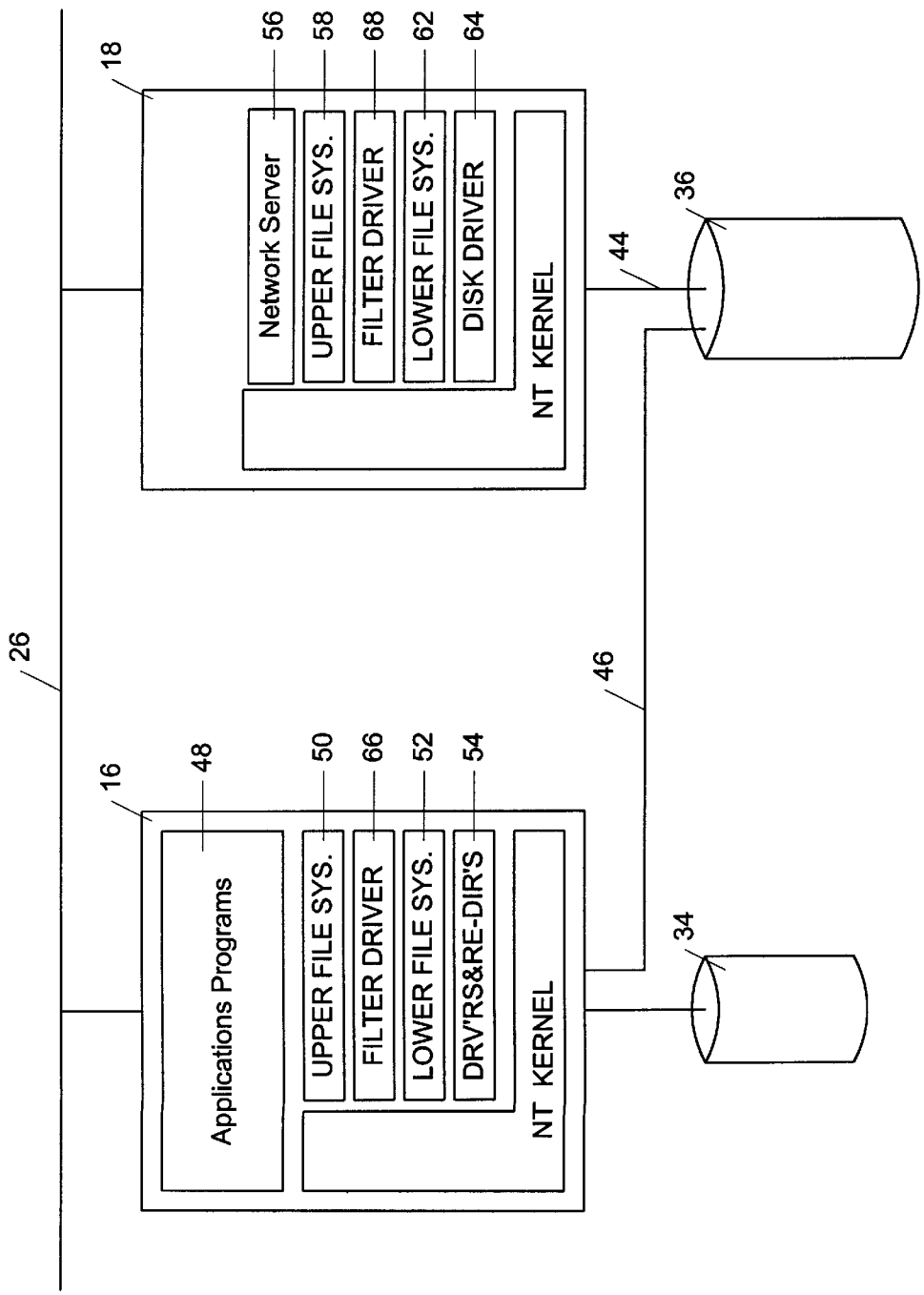

FIG. 2 depicts further detail of the hardware and software architecture permitting the sharing of peripheral device 36 by nodes 16, 18 in a system according to the invention. Though the discussion that follows is directed to sharing among these devices, those skilled in the art will appreciate that the teachings can be applied equally, e.g., to the sharing of device 38, by nodes 18, 20, the sharing of device 34 by nodes 16, 18, and so forth. Moreover, those teachings can be applied to create a scaleable network. To this end, additional server nodes, such as node 20, can be coupled to a common peripheral device 36, as well as to the node 18 which controls that device, to give still further nodes 22–24 to that device 36. Preferred uses of the invention are to permit two (or more) network client nodes, e.g., 14, 16, to share a common peripheral device, or to permit two (or more) network servers, e.g., 18, 20, to share such a device.

Referring to the drawing, nodes 16, 18 are coupled to one another via communications pathway 26 and to peripheral device 36 via pathways 44, 46, respectively. As noted above, pathway 44 (coupling device 18 to peripheral 36) can be a SCSI channel or other conventional peripheral device interconnect. Likewise, as noted above, pathway 46 (coupling device 16 to peripheral 36) can be a conventional peripheral device interconnect, though, preferably, is a high-speed interconnect such as fibre channel, "firewire" (i.e., IEEE 1394 bus), serial storage architecture (SSA) bus, high-speed Ethernet bus, high performance parallel interface (HPPI) bus or other high-speed peripheral device bus.

Executing on node 16 are one or more applications programs 48 (e.g., including video editing programs, image analysis programs, and so forth) that generate requests for access to local and networked peripheral devices, including shared device 36. Those applications programs execute in the conventional manner under the control of an operating system, e.g., Windows NT, which includes a file system that services those access requests.

In the illustration, that file system is represented by elements 50–54, including "upper" file system 50, representing the Windows NT I/O Subsystem Manager and other components responsible for interfacing with applications programs 48 and for routing peripheral device access requests to the file system; "lower" file system 52, representing the Windows NT File system drivers and intermediate drivers and other components responsible for local, disk-based file systems, SCSI drivers and the like providing generic functionality to a common set of devices; and drivers 54, representing software (and hardware) components for transferring information to and from attached peripheral devices 34, 36.

Because node 16 is a client vis-a-vis the Windows NT network, the drivers also include a network redirector, such as the Windows NT LANManRedirector, that transfers access requests to and from the shared peripheral device 36 via server node 18 and pathways 26 and 44. The node 18, which includes network server component 56, handles such requests in the conventional manner of a server of a networked digital data processing system. As illustrated, node 18 also includes a file system, comprising elements 58–64, whose operations parallel those of components 50–54 on the node 16.

Though the illustrated architecture for node 16 is in accord with that dictated by Windows NT, those skilled in the art will appreciate that the invention may be embodied in devices running under other operating systems, as well.

General computer networking provides a great many benefits of which a primary is having a common/central pool of storage that can be shared in a controlled manner between multiple nodes. That sharing takes place over a network communications pathway, such as a local area network (LAN), which is usually fast enough for only basic uses. Some uses, such as video or graphics or large numbers of connected users, however, can saturate a conventional network communications pathway.

Systems constructed and operated according to the invention allow multiple nodes to share a peripheral device without intervening communications pathways or nodes bottlenecking selected data transfers. A server node is still used in this "fused drive" approach to store physical file mappings and other administrative information—and to otherwise administer—the shared device. A direct connection, or "directly attached disk connect," is also provided however between each node and the shared device to permit certain operations, e.g., bulk reads and writes, to be accomplished directly between the nodes and the peripheral device. The illustrated embodiments provide this capability through communications pathways such as pathway 46 and through filter drivers 66, 68 incorporated into the file systems. Among the many advantages of these systems is that they provide orders of magnitude performance improvements at virtually no additional hardware costs.

In the discussion that follows, systems according to the invention are variously referred to as "fused drive systems", "fused drive technology", "fused drive", and the like. Unless otherwise evident from context, the term "file system" refers to the combined operation of the nodes' native file systems (e.g., comprising elements 50–54 and 56–64) and of the network server, e.g., 56., and file system, e.g., 56–64, of the node to which the shared peripheral device is assigned and of the file system, e.g., 50–54 of the node that shares that device.

Networking

To facilitate implementation of the invention, it is preferable that the underlying digital data processing system have at least basic networking capabilities that allows for the concept of "file server". Windows NT provides such an architecture. Programs can access files either locally or remotely through a variety of Windows general file specifications (e.g. "C:t.txt" where "C" is a local drive, or "H:t.txt" where "H" is mapped network drive, or "\\server\share\t.txt", where 'server' is another computer). This abstraction is successful because the applications software 48 need not know about the specifics of where a file resides in order to be able to access it through a well defined and globally supported set of commands.

File Map

In order to correctly intercept file reads and writes (to provide for acceleration), it is preferable to know exactly how each file is physically laid out on the shared peripheral device, e.g., disk 36. Application programs 48 make requests based on logical file blocks. The file system presents to an application 48 an abstraction of a file that appears to be a series of contiguous data blocks. In reality, the file system allocates physical pieces of the disk drives separately and knits them together in a variety of file system specific trees and directories and maps (and other structures). While a logical-block x might reside on physical block y, block x +1 might live an entirely different area.

As with other operating systems, Windows NT provides functions for interrogating the physical allocation map of a file. These are provided primarily for the handful of programs that actually need to understand such things (e.g., disk defragmenters). Without this map, it might be possible to build a map of file blocks by understanding the NTFS data structures and traversing many native file structures.

Volume Serial Number

Systems according to the invention provide two paths to the shared storage, e.g., device 36: one path is via the directly attached media wire, e.g., 46, and the other path is through conventional networking, e.g., 26, to the other node, e.g., 18, that has direct access. "Fusing" a drive in accord with the invention requires intercepting important I/O commands an issuing them locally. But to which local device?

Each disk volume, e.g., 36, has a "volume serial number" that NT places on the volume. When an applications program 48 or user makes a request to "fuse" a volume, the illustrated system locates the correct locally attached volume by examining the volume serial number.

File System Filters

Most modern operating systems are put together in well defined layers and those layers are allowed to have well defined pieces (developed by "third parties") plug into them to extend functionality. The most common example is a add-on board, e.g. a video board, and needs some special software to handle the board details yet presents a standard interface to the rest of the operating system so that software written to the generic abilities will work with the new device.

Windows NT at a very fundamental layer abstracts all devices; that is, any device (be it a physical adapter or a software device) winds up having an entity in the NT system known as a "device". A device supports a well defined interface and all implementations of a device must provide appropriate code for the planned interface points.

What is significant is that NT supports "layering" a device. This means providing an ability to intercept any and all transactions to a device and possibly introduce additional processing. A layered device driver can do any of the following per function: handle the function entirely itself and dismiss it; do some pre-processing and then let the natural function take over; do post processing (after the natural function).

The illustrated embodiment exploits this structuring opportunity. That is, in general the goal is to let as much of regular processing happen so that all the natural benefits are realized (security, sharing, etc), and only accelerate certain important features The NT function IOAttachDevice is used to perform the layering.

NT Device Types

There are many different extensions of the base "driver" class in NT. The following are the ones that are interesting for solving this problem:

FileSystemDevice

FileSystemRecognizer

LANMANRedirector

NT typically supports two main file system types: NTFS and FAT. Each "volume" in the NT system (e.g. "C:") is an instance of a FileSystemDevice. NT provides a generic file sub-system interface for applications (e.g. open( ), read( ), write( )). NT will then call the appropriate file system-specific routines based on the target. There is a "class" (a driver) for each type of file system present (e.g. NTFS class, FAT class, etc), and a separate "instance" of that class for each and every volume (e.g. C:, D:, E:).

There is a pseudo device called the FileSystemRecognizer. Whenever NT mounts a file system (typically at boot time), NT determines which class needs to manage it, and then provides that class an opportunity to deal with it. NT provides a mechanism to inform other system elements of this mounting (or unmounting). That mechanism is through the pseudo device FileSystemRecognizer. One of the particular entry points for the FileSystemRecognizer provides details regarding volumes that are being mounted or dismounted. Thus, a layered driver on top of this device could then be made aware of such events taking place.

It is preferable for the illustrated embodiment to intercept and thus know about all system mount/unmount activity. Information such as the volume label and physical device elements is important to note for subsequent tasks.

On the "client" side, e.g., on the node 16 that accesses the shared peripheral device but that does not inherently control it, the driver 66 intercepts volume mounts and dismounts. It may disallow some volumes from mounting, e.g., perhaps due to security settings, or other issues such as multi-writers. If allowed to mount, the driver 66 will capture the volume label (and signature which is volume unique) and other pertinent information. This data is stored in a globally available area the server driver 68 can use when necessary. During a dismount, this information is discarded.

For whatever reason, network mapped devices (which appear as a mounted file system to the casual NT user), do not go through this mount/dismount notification process. The illustrate embodiment needs to be aware of network mounted file systems so that it can have an opportunity to accelerate some of their functions. For this purpose, it layers on top of the separate driver class called LANMANRedirector that essentially manages NT's LAN Manger mounted volumes (which is the typical network file system mounter that comes with NT).

Overall Flow Summary

In general networking there is typically a concept of a "server" machine and many clients that are attached to that server. The server "serves" tasks to the clients and one of the most typical tasks is serving file data. Mapped file systems allow a client to pretend that a disk that is physically mounted on a "server" machine to seem mounted on the client as well. The network and operating systems will cooperate to manage that illusion and transparently feed data back and forth between the machines.

Though the invention can be implemented to achieve a client-server relationship between the devices, e.g., 16, 18, that share a peripheral device, e.g., 36, it does not necessitate such a relationship. That is, there is no requirement for a single machine to be the data master of all transactions. However, there is a concept of a master writer, e.g., node 18, and for simplicity sake this document will refer to that machine as the "server" for a particular volume.

In the illustrated embodiment, all participating machines, e.g., 16, 18, have a direct connection to the shared peripheral device, e.g., 36, and thus they all have the opportunity to mount the volumes as local volumes (and conceivably at the same time). Because of cache coherency issues, it is necessary to insist that only a single machine be a real "writer" (server) of a volume at a time and that proper cache flushing take place between ownership changes.

The illustrated embodiments route some requests through the regular networking technology and others are by-passed and go directly to the attached storage interface. Thus, accessing the shared device, e.g., 36, will in fact result in some amount of network activity and thus some amount of impact on another machine (that is "serving" the interface to that storage volume).

The term "server", as used herein and unless otherwise evident from context, means "the machine that is serving the needs regarding a particular volume", but does not mean "the machine that serves all the needs of a set of volumes" necessarily. A peer-to-peer arrangement is both possible and beneficial wherein each participant is a primary writer (server) for some volumes, and a client for the others. The reality is that the number of bytes transferred over the conventional network is insignificant in comparison to the number "accelerated" to the direct attached interface.

Preliminary Configuration Issues

In order to implement the invention, it is required that all participating nodes, e.g., 16, 18, be coupled to the shared device, e.g., 36, preferably by a direct attached interface, such as Fibre Channel, or the like, and that they can "mount" that device locally. It is also required that all participants, e.g., 16, 18, be in communication with each other over regular networking, e.g., 26, and that the regular network protocols be present that allow for mounting remote file systems.

The illustrated embodiment receives a request to "fuse" a particular volume, e.g., device 36, from the user or from an applications program 48. In order to proceed with this, it must know which node is to be the real "server" of that volume.

Booting

When each node, e.g., 16, 18, is first booted, the local file system filter driver, e.g., 66, 68, is loaded and "layered" on top of the FileSystemRecognizer and is thus apprised about the mounting/unmounting of volumes. Each time a volume is mounted, it will record information about that volume for possible later use (e.g., in a global data structure) and also install the filter for that particular FileSystemDevice. The driver, e.g., 66, also layers on top of the LANMANRedirector and is thus apprised of all activities related to mapped drives. The mounting of a volume that will be "fused" in accord with the invention is shown in FIG. 3, step (1).

When a "make fused" request comes in (e.g., from a configuration program), the local filter driver, e.g., 66, takes the following actions:

1) It issues a request to the resident portion of the file system to create a mapped device for it (e.g. M:);
2) When the file system completes the mapping, it performs "mount" and the local driver, e.g., 66 receives control (due to the layering on the LANMANRedirector);
3) The local filter driver then checks the specifics of this network volume being mounted (specifically the volume signature) and compares that to all local volumes that it has access to. If it finds a match, then it knows it has an alternative (and higher performance path) to that same storage and records this information in global structures for subsequent transactions to exploit.

Figure 3:
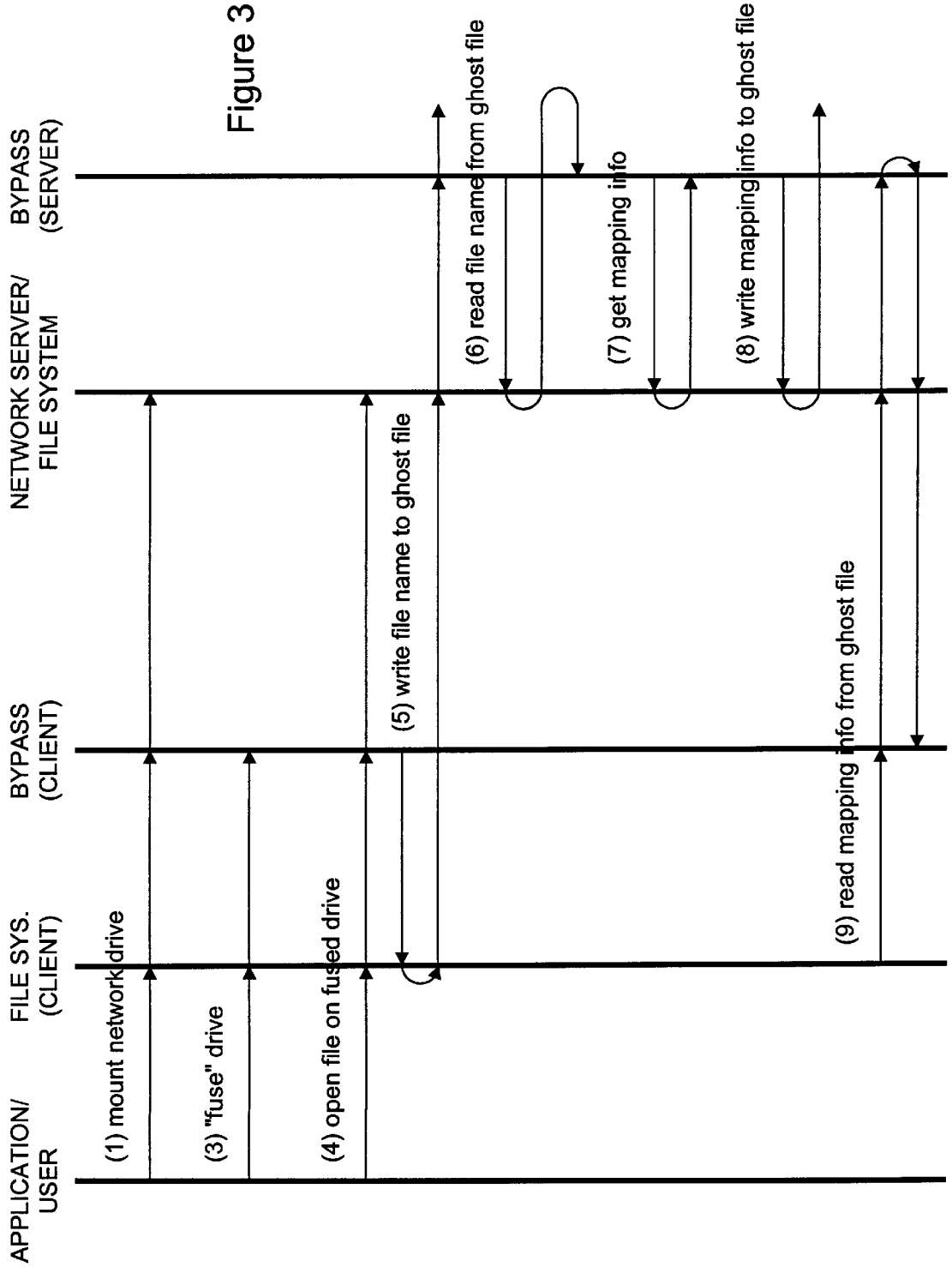

The aforementioned actions are represented in FIG. 3, as step (3).

Network Mapping

The natural course is for there soon to be some accesses of this newly created network device, e.g., peripheral device 26. All accesses of all network devices go through the filter driver, e.g., 66, that is layered on the LANMANRedirector. "CreateFile( )" is the Windows function for opening files (among other things) and is a required first step before files can be read or written. The opening of a file on the fused drive is indicated by step (4) in FIG. 3.

When CreateFile is called on client node 16, the client filter driver 66 interrogates the specifics of the file name and determines whether the file being accessed lives on a volume that is "fused". If so, the filter driver 66 needs to procure the information about how the file is physically laid out on the device so that subsequent read/write calls can go directly to the shared peripheral 36.

Referring to step (5) of FIG. 3, it gathers this information by sending a request to the real "writer" (server), e.g., 18, of that volume. Specifically, the filter driver 66 writes a request into a specific file (the "ghost" file) on an actual or virtual device controlled by the server, e.g., 18. That write request includes the name of the file referenced in the intercepted CreateFile( ) call. In a preferred embodiment, the aforementioned ghost file is so named because it doesn't really exist; rather, accesses to and from it on the server side are intercepted by the filter driver 58.

Server Side

The filter driver, e.g., 68, resident on the server, e.g., 18, detects the request and determines the details of the file layout. As shown in step (6) of FIG. 3, it first obtains the name of the file by reading the ghost file. In step (7), it then calls a Windows NT function that is provided for defragmenter packages and other disk-optimizing utilities to obtain the file layout. To insure coherency, whenever a file map is requested, the server driver 68 also issues a local "purge" call to remove any material regarding that file in its own local caches.

In step (8), the server filter driver 68 then writes that information back to the ghost file. This, in turn, is read by the client filter driver 66. See step (9). When the map comes back, the client filter driver 66 stores in a global data structure to be exploited by subsequent read and write calls.

Reads and Writes

Figure 4:
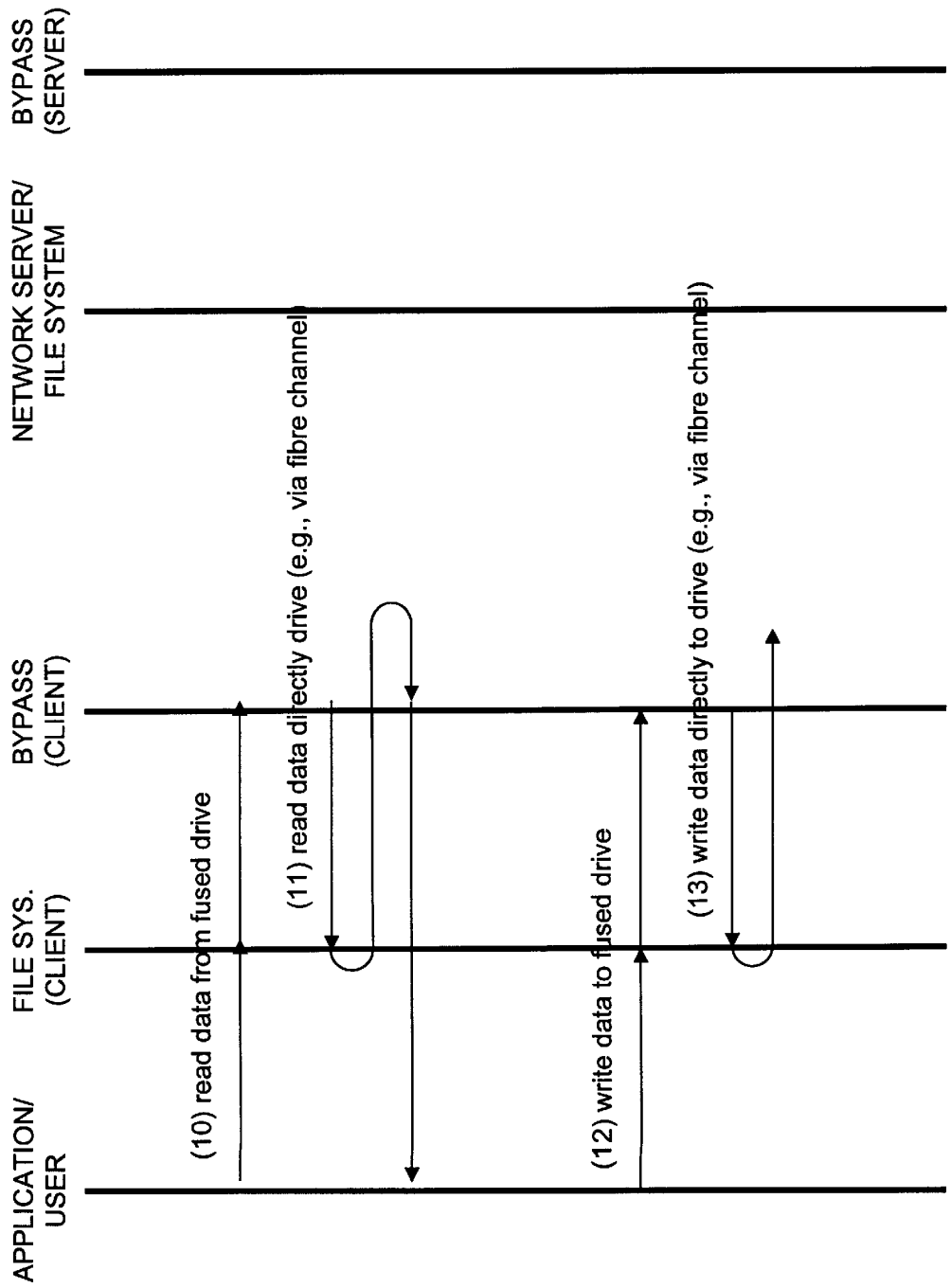

In step (10) of FIG. 4, an applications program 48 on the client node 16 attempts to read a file on the shared device 36. Upon intercepting that request, the client filter driver 66 interrogates the global data structures to determine if the request is directed to a file for which mapping information is present. If so, previously stored the map is interrogated to determine the physical blocks needed from the device 36 to fulfill the request The blocks are then read via the direct interconnection pathway, e.g., 46, and the request is dismissed (and no network transactions take place). See step (11).

As shown in steps (12)–(13), a similar sequence is effected when an applications program 48 on the client node 16 attempts to write a file on the shared device, e.g., 36. However, any time such a file's allocation is extended, the allocation request is permitted to take the normal network path (e.g., via network communications pathway 26) for servicing by the network server 56 and file system resident on the server node 18. Once that is completed, another mapping is obtained as described above. In one embodiment of the invention, the client filter driver 66 forces any such allocations to be much larger so that they happen less frequently. File writes then can take place in the same way that file reads do (using the map to determine the actual blocks to locally write).

In a preferred embodiment of the invention, the client filter driver 66 can limit the respective node's access to the shared device 36 via the auxiliary pathway 44. This prevents the node 16 from "hogging" the device 36 to the exclusion of the other nodes. Limiting can be accomplished by tracking the number of bytes transferred, or the number of accesses made, by node 16 over pathway 44 per unit time. If that number exceeds a predetermined numerical "throttling" limit, the driver 66 can delay responding to a newly intercepted request or route it for handling by the server 18 as a conventional network request.

Normal Activities

Apart from file reads and writes, the filter drivers 66, 68 permit all other file activities to go through the normal networking interfaces. These include security checks, time and date stamps, directory look ups, etc. Those skilled in the art will appreciate that reads and writes account for the grand majority of the total number of bytes that would have passed through the network and, hence, by handling separately in the manner discussed above, the invention achieves great speed increases.

Specifics of Startup

The filter drivers 66, 68 are essentially device drivers and are started in the normal operating system device context (system boot time). This is the desired time for the software to "hook" (layer) into the other devices that it needs to have control over. The drivers 66, 68 can correctly layer into the FileSystemRecognizer device at this time, but cannot do so for the LANMANRedirector (due to some internal NT restrictions). So, accompanying software start up a system thread that politely "polls" for the existence of the LANMANRedirector (which will happen shortly after boot) and, once discovered, perform the normal layering.

An important part of the driver filter 66, 68 operation at boot time is to prevent any of the shared storage drives from mounting. In normal situations, NT attempts to mount all directly attached storage (and knows nothing natively about the fact that this storage may be already in use or mounted on another system). If NT were allowed to mount a shared device, and there were "writes" taking place to that drive from another system, NT would be confused and would attempt a "rollback" operation, wiping out any data written recently written (this is a recovery procedure that needs to be done in the event of an abrupt shutdown and is inappropriate in a shared disk environment).

Described herein are methods and apparatus meeting the objects set forth above. Those skilled in the art will appreciate that the illustrated embodiment is shown and described merely by way of example and that other embodiments incorporating changes therein fall within the scope of the invention, of which we claim:

1. A digital data processing system with improved access to information stored on a peripheral device, comprising
   A. first and second nodes coupled to one another over a first comnnunications pathway,
   B. the first node being coupled to a peripheral device over a third communications pathway,
   C. a file system, executing on the first and second nodes, being capable of responding to access requests generated by the first node, for
      (i) maintaining administrative information pertaining to storage of the data designated by the request on the peripheral device,
   D. a first bypass, executing on at least the first node, for interceding in response to at least a first selected access request applied thereby to the file system, by transferring data designated by that request between the first node and the peripheral device over the third communications pathway in accord with administrative information maintained by the file system pertaining to storage of that data on the peripheral storage device.

2. A digital data processing system according to claim 1, wherein the transfer of data by the first bypass between the first node and the peripheral device obviates transfer of such data by the file system between the first node and the peripheral device.

3. A digital data processing system according to claim 1, wherein the first bypass transfers the designated data over the third communication, pathway to physical storage locations on the peripheral device determined from the administrative information for that data maintained by the second node.

4. A digital data processing system according to claim 3, wherein the first bypass obtains from the second node administrative information from which can be determined physical storage locations in the peripheral device for the data designated by the first request.

5. A digital data processing system according to claim 4, wherein the first bypass at least initiates obtaining administrative information from the second node by generating and applying to the file system a second access request, the second request being for access to a logical unit to which access is controlled by the second node.

6. A digital data processor according to claim 5, wherein the file system transfers the second access request to the second node over the second communications pathway.

7. A digital data processor according to claim 5, wherein the second request is for access to a logical unit other than a file designated in the first access request.

8. A digital data processing system according to claim 7, wherein the logical unit is a file that resides on a peripheral device local to the first node.

9. A digital data processor according to claim 8, wherein the request generated by the first bypass is a request to write and a file.

10. A digital data processing system according to claim 7, comprising a second bypass, executing on the second node, for responding to the second access request by obtaining from the second node, and for at least temporarily retaining, a physical mapping for a file designated by the first access request.

11. A digital data processing system according to claim 10, wherein the first bypass obtains the physical mapping for the file designated by the first access request by generating and applying to the file system a third access request for access, the third request designating the logical unit designated by the second access request.

12. A digital data processing system according to claim 4, wherein
   A. the first bypass generates and applies to the file system a second access request, the second access request being a request for writing a logical unit an identifier of a file designated by the first access request, the logical unit being a file to which access is controlled by the second node but which is other than the file designated in the first access request,
   B. the second bypass responds to the second access request by reading the logical unit to determine the identifier, obtaining from the second node a physical mapping for a file designated by that identifier, and writing that physical mapping to the logical unit, and
   C. the first bypass generates and applies to the file system a third access request for access, the third request being a request for the physical mapping from the logical unit.

13. A digital data processing system according to claim 1, wherein the first bypass selectively limit transfers between the first node and the peripheral device over the third communications pathway.

14. A digital data processing system according to claim 13, wherein the first bypass selectively limits such transfers to facilitate access to the peripheral device by a node other than the first node.

15. A digital data processing system according to claim 14, wherein the bypass limits such transfers in accord with a predefined throttling limit.

16. A digital data processing system according to claim 1, wherein the first communications pathway comprises any of a wide area network interconnect, local area network interconnect, internet interconnect, or other network interconnect.

17. A digital data processing system according to claim 1, wherein the third communications pathway comprises any of a fibre channel, a firewire bus, a serial storage architecture (SSA) bus, high-speed Ethernet bus, high performance parallel interface (HPPI) bus, and other high-speed peripheral device bus.

18. A digital data processing system with improved file access, comprising
   A. first and second nodes coupled to one another over a first communications pathway,
   B. the first node being coupled to a peripheral device over a third communications pathway,
   C. an applications program executing on the first node generating requests for access to files stored on the peripheral device, and for applying those requests to a file system,
   D. the file system, executing on the first and second nodes, being capable of responding to access requests generated by the first node, for
      (i) maintaining administrative information pertaining to physical mappings for files stored on the peripheral device, and
   E. a first bypass, executing on at least the first node and coupled to the file system, for transferring between the first node and the peripheral device over the third communications pathway data designated by at least selected file access requests, the first bypass transferring such data based on administrative information pertaining to physical mappings maintained by the file system, such transfers being in lieu transfer of that data via the second node and via the first and second communications pathways.

19. A digital data processing system according to claim 18, wherein the first bypass initiates obtaining administrative information pertaining to physical mappings from the second node by generating and applying to the file system a second access request, the second request being directed to a file for which access is controlled by the second node and which is not a file designated in the first access request.

20. A digital data processing system according to claim 19, wherein the second access request includes an identity of the file designated in the first access request.

21. A digital data processing system according to claim 19, comprising a second bypass, executing on the second node, for responding to the second access request by obtaining from the second node, and for at least temporarily retaining, a physical mapping for a file designated by the first access request.

22. A digital data processing system according to claim 21, wherein the first bypass obtains the physical mapping for the file designated by the first access request by generating and applying to the file system a third access request for access, the third request designating the logical unit designated by the second access request.

23. A digital data processing system according to claim 22, wherein the third access request is directed to the same file as the second access request.

24. A digital data processing system according to claim 19, wherein
   A. the first bypass generates and applies to the file system a second access request, the second access request being a request for writing a logical unit an identifier of a file designated by the first access request, the logical unit being a file to which access is controlled by the second node but which is other than the file designated in the first access request,
   B. the second bypass responds to the second access request by reading the logical unit to determine the identifier, obtaining from the second node a physical mapping for a file designated by that identifier, and writing that physical mapping to the logical unit, and
   C. the first bypass generates and applies to the file system a third access request for access, the third request being a request for the physical mapping from the logical unit.

25. A digital data processing system according to claim 24, wherein at least one of the first bypass stores in a data structure physical mappings for the file designated by the first access request.

26. A digital data processing system according to claim 24, wherein the second bypass flushes any write cache for the file designated by the first access request in connection with obtaining physical mappings for that file from the second node.

27. A scalable networked digital data processing system with improved access to information stored on a first peripheral device, comprising
   A. a plurality of networked nodes, including at least first and second server nodes, coupled to one another via a first communications pathway,
   B. the first server node being coupled to a first peripheral device over a third communications pathway,
   C. each of the first and second server nodes being coupled to zero, one or more client nodes,
   D. a file system, executing on at least the first and second server nodes, being capable of responding to access requests generated by the first server node, for maintaining administrative information pertaining to storage of the data designated by the request on the first peripheral device, and
   E. a first bypass, executing on at least the first server node, for interceding in response to at least a first selected access request applied thereby to the file system, by transferring data designated by that request between the first server node and the first peripheral device over the third communications pathway in accord with administrative information maintained by the file system pertaining to storage of that data on the peripheral storage device.

28. A scalable networked digital data processing system according to claim 27, further comprising
   A. a third server node coupled to at least the second server node via a fourth communications pathway,
   B. the file system, executing on at least the second and third server nodes, being capable of responding to access requests generated by the third server node, for
      (i) transferring data designated by the request between the third server node and the first peripheral device via the second server node and via the second and fourth communications pathways,
      (ii) maintaining administrative information pertaining to storage of the data designated by the request on the first peripheral device,
   C. a second bypass, executing on at least the third server node, for interceding in response to at least selected access requests applied thereby to the file system, by transferring data designated by that request between the third server node and the first peripheral device over the fifth communications pathway in accord with administrative information maintained by the file system pertaining to storage of that data on the peripheral storage device.

29. A method for improved access to a peripheral device in a digital data processing system of the type having first and second nodes coupled to one another over a first communications pathway, a file system, executing on the first and second nodes, being capable of responding to access requests generated by the first node, for maintaining administrative information pertaining to storage of the data designated by the request on the peripheral device, the method comprising:

A. coupling the first node to the peripheral device over a third communications pathway, and B. bypassing the file system, in part, in responding to at least a first selected access request applied by the first node to the file system, such bypassing including transferring data designated by that request between the first node and the peripheral device over the third communications pathway in accord with administrative information maintained by the file system pertaining to storage of that data on the peripheral storage device.

30. A method according to claim 29, wherein the bypassing step obviates transfer via the second node and via the first and second communications pathways of data transferred between the first node and the peripheral device over the third communications pathway.

31. A method according to claim 29, wherein the bypassing step comprises transferring the designated data over the third communications pathway to physical storage locations on the peripheral device determined from the administrative information for that data maintained by the second node.

32. A method according to claim 31, wherein the bypassing step comprises at least initiating the obtaining of administrative information from the second node by generating and applying to the file system a second access request, the second request being for access to a logical unit to which access is controlled by the second node.

33. A method according to claim 32, wherein the second request is for access to a logical unit other than a file designated in the first access request.

34. A method according to claim 33, wherein the logical unit is a file that resides on a peripheral device local to the first node.

35. A method according to claim 34, wherein the request generated by the first bypass is a request to write a file.

36. A method according to claim 35, wherein the bypassing step comprises transferring, to the first node, the physical mapping for the file designated by the first access request by generating and applying to the file system a third access request for access, the third request designating the logical unit designated by the second access request.

37. A method according to claim 31, comprising responding to the second access request by obtaining from the second node, and at least temporarily retaining on any of the second node and the peripheral device, a physical mapping for a file designated by the first access request.

38. A method for improved access to a peripheral device in a scalable networked digital data processing system of the type having a plurality of networked nodes, including at least first and second server nodes, coupled to one another via a first communications pathway, each of the first and second server nodes being coupled to zero, one or more client nodes, a file system, executing on at least the first and second server nodes, being capable of responding to access requests generated by the first server node, for (i) transferring data designated by the request between the first server node and the first peripheral device, and (ii) maintaining administrative information pertaining to storage of the data designated by the request on the first peripheral device, the method comprising the steps of A. coupling the first server node to the first peripheral device over a third communications pathway, B. bypassing the file system, in part, in responding to at least a first selected access request applied by the first server node to the file system, such bypassing including transferring data designated by that request between the first server node and the peripheral device over the third communications pathway in accord with administrative information maintained by the file system pertaining to storage of that data on the peripheral storage device.

39. A method according to claim 38, further wherein the networked digital data processing is of the type having a third server node coupled to at least the second server node via a fourth communications pathway, a file system, executing on at least the second and third server nodes, being capable of responding to access requests generated by the third server node, for (i) transferring data designated by the request between the third server node and the first peripheral device, and (ii) maintaining administrative information pertaining to storage of the data designated by the request on the first peripheral device, the method comprising A. coupling the third server node to the first peripheral device over a fifth communications pathway, B. bypassing the file system, in part, in responding to at least a first selected access request applied by the third server node to the file system, such bypassing including transferring data designated by that request between the third server node and the peripheral device over the fifth communications pathway in accord with administrative information maintained by the file system pertaining to storage of that data on the peripheral storage device.

* * * * *